United States Patent
Sasidharan et al.

(10) Patent No.: US 12,406,066 B2
(45) Date of Patent: Sep. 2, 2025

(54) DECOUPLED EXTERNAL STORAGE DEVICE BOOTING

(71) Applicant: Western Digital Technologies, Inc., San Jose, CA (US)

(72) Inventors: Vinod Sasidharan, Bangalore (IN); Dattatreya Nayak, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 215 days.

(21) Appl. No.: 17/875,074

(22) Filed: Jul. 27, 2022

(65) Prior Publication Data

US 2024/0037240 A1 Feb. 1, 2024

(51) Int. Cl.
G06F 21/57 (2013.01)

(52) U.S. Cl.
CPC .......... G06F 21/575 (2013.01); G06F 21/572 (2013.01)

(58) Field of Classification Search
CPC ........ G06F 3/062; G06F 21/57; G06F 21/572; G06F 21/575
See application file for complete search history.

(56) References Cited

U.S. PATENT DOCUMENTS

| | | | |
|---|---|---|---|
| 8,521,956 B2 | 8/2013 | Della Pia et al. | |
| 8,935,464 B2 | 1/2015 | Sutardja et al. | |
| 10,649,674 B2 | 5/2020 | Sasidharan et al. | |
| 2011/0125995 A1* | 5/2011 | Choi | H04N 21/443 713/2 |
| 2012/0254599 A1* | 10/2012 | Kim | G06F 9/4401 713/1 |
| 2013/0013906 A1* | 1/2013 | Brown | G06F 9/4403 713/2 |
| 2014/0281456 A1* | 9/2014 | Mejia | G06F 21/575 713/2 |
| 2015/0326584 A1* | 11/2015 | Karame | G06F 21/64 726/30 |
| 2017/0131753 A1* | 5/2017 | Ahmed | G06F 21/572 |
| 2017/0249155 A1 | 8/2017 | Sundrani et al. | |
| 2018/0082065 A1* | 3/2018 | Liu | H04L 9/3247 |
| 2018/0089434 A1* | 3/2018 | Sibert | H04L 63/0853 |
| 2018/0095769 A1* | 4/2018 | Peng | G06F 8/654 |

(Continued)

Primary Examiner — Phil K Nguyen
Assistant Examiner — Cheri L Harrington
(74) Attorney, Agent, or Firm — Rutan & Tucker LLP; Hani Z. Sayed; Ravi Mohan

(57) ABSTRACT

Storage devices may be utilized in external devices that communicate with host computing devices over various communication ports and protocols. Traditionally, storage devices utilize bootloading data, such as boot ROMS, to start normal operations of the device. However, many storage devices are unable to change or update bootloading data once the device has been manufactured or deployed. Thus, methods, systems, and devices described herein decouple the bootloading process from the storage device and load bootloading data from an external device. The bootloading data can be loaded via a wireless communication connection from an external device, where it can be updated as needed. Once loaded, the bootloader can begin the process of loading firmware and starting the normal operation of the drive over regular wired communication ports. When the bootloading data or firmware cannot be loaded externally, traditional booting methods can be used utilizing previously stored copies of the required data.

19 Claims, 5 Drawing Sheets

(56) References Cited

U.S. PATENT DOCUMENTS

| | | | | |
|---|---|---|---|---|
| 2018/0285568 | A1* | 10/2018 | Finger | G06F 21/575 |
| 2020/0159965 | A1* | 5/2020 | Norem | H04L 9/3268 |
| 2020/0257520 | A1* | 8/2020 | Doering | G06F 9/4411 |
| 2021/0208900 | A1 | 7/2021 | Pamoti et al. | |
| 2021/0312057 | A1* | 10/2021 | Kloth | G06F 3/0623 |
| 2021/0406359 | A1* | 12/2021 | Culshaw | G06F 3/0679 |
| 2021/0406381 | A1* | 12/2021 | Heisrath | H04L 63/108 |
| 2022/0179960 | A1* | 6/2022 | Spangler | H04L 9/3239 |
| 2022/0198018 | A1* | 6/2022 | Wentz | H04L 9/3268 |
| 2022/0335132 | A1* | 10/2022 | Thor | H04L 9/3247 |
| 2022/0342657 | A1* | 10/2022 | Amundsen | G06F 8/65 |
| 2023/0031974 | A1* | 2/2023 | Suryanarayana | G06F 21/575 |
| 2023/0169174 | A1* | 6/2023 | Jung | G06F 21/64 726/26 |

* cited by examiner

DECOUPLED EXTERNAL STORAGE DEVICE BOOTING

The present disclosure relates to storage systems. More particularly, the present disclosure relates to utilizing external devices to boot storage devices with externally stored bootloading data.

BACKGROUND

Storage devices are ubiquitous within computing systems. Recently, solid-state storage devices (SSDs) have become increasingly common. These nonvolatile storage devices can communicate and utilize various protocols including non-volatile memory express (NVMe), and peripheral component interconnect express (PCIe) to reduce processing overhead and increase efficiency.

Storage devices could be configured as internal or external devices to host-computing devices. Many external storage devices utilize universal serial bus (USB) interfaces to communicate between each other. Traditionally, when utilizing external storage devices, the booting process to start the storage device required the loading of an internally stored bootloader and subsequent firmware to bring the storage device online such that it can communicate over USB.

However, many external devices may require updates to firmware, bootloaders, or other data that may require to be loaded into the device before USB connection can be established. Additionally, certain types of bootloading data cannot be changed once manufactured and/or deployed. Changing bootloading data may also be desired or required in the event of a crash or other restore process.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
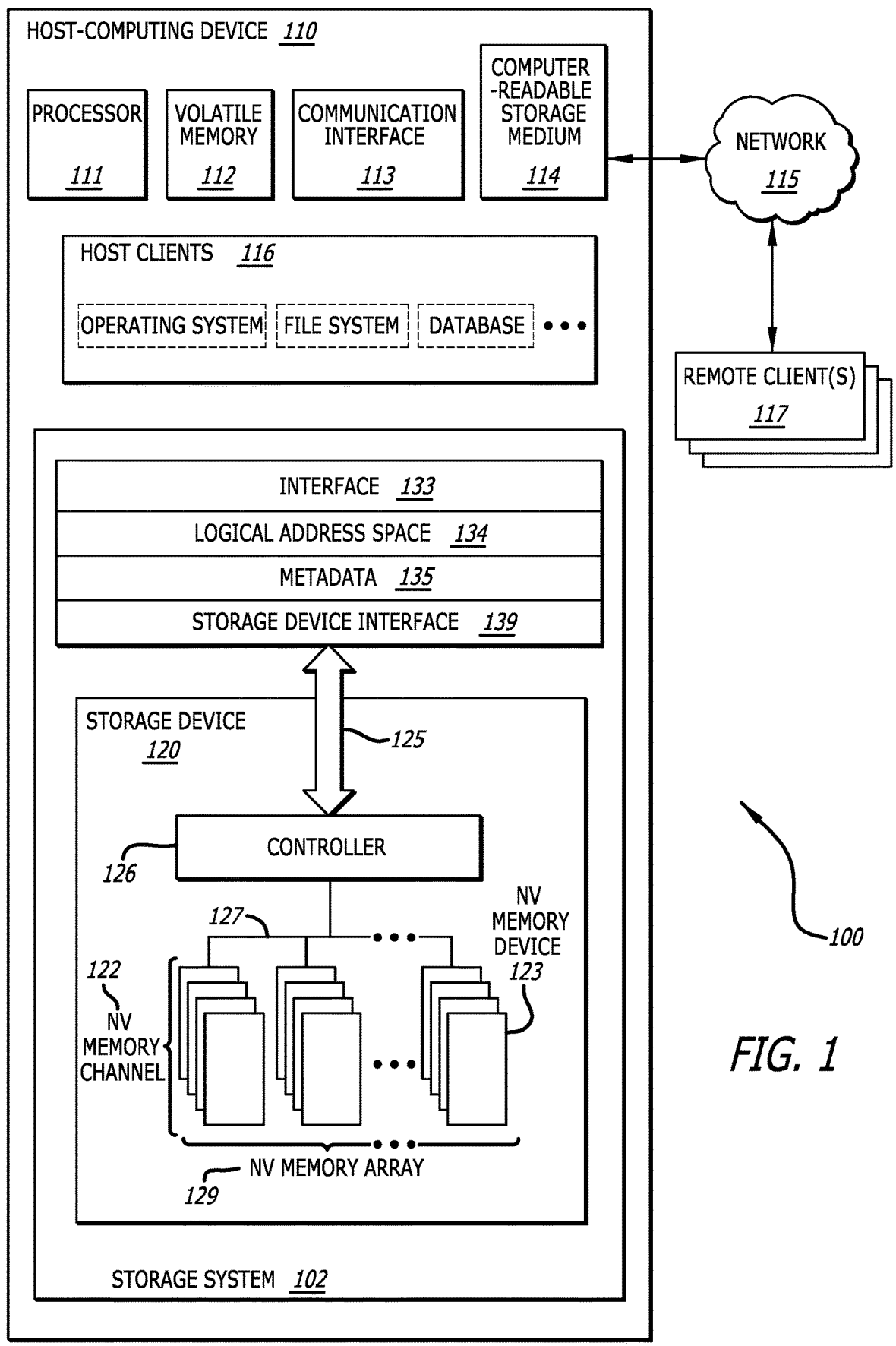
FIG. 1 is schematic block diagram of a host-computing device with a storage device suitable for decoupled booting in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that decouple the loading of a bootloader from within the storage device by communicating wireless with an external device, such as a host computing device. By utilizing this decoupling process, legacy booting memories can be avoided and dependency on NAND flash generation can become less dependent. These processes can utilize on-the-fly injection of bootloaders via bootloading data which can direct the loading of the final firmware required for external USB SSD operation.

Traditional methods of booting these devices can rely or tie the data to the specific memory device used, which can create a major dependency on migrating to the latest types of memory devices and controllers which support higher and increased speeds and interfaces. By utilizing a decoupled process, these dependencies can be avoided.

More specifically, the process could first power on or wake a controller which has one or more storage and/or security processors in a halted state. The initial code executed may be a wireless communication read-only memory (ROM) such as a Bluetooth® ROM that can establish a connection with an external device and read the bootloader present within that external device. This host application can dynamically, on-the-fly inject the bootloader or bootloading data directly to the storage device via this wireless connection.

The bootloader can be loaded into an internal memory array of the controller via a security process (often though a specialized security processor) that can verify, validate, and enable the storage processor for subsequent execution. Often, the operations executed by the security processor will not have any dependencies on the geometry or structure of the memory array. The storage processor can begin to execute the bootloader which can direct the reading/fetching of firmware data from within the main memory array of the storage device. The firmware data is then loaded into and executed from the memory array from within the controller of the storage device. Once loaded, the firmware can be executed and then enable final USB operation within the storage device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C #, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for sub-block management in accordance with an embodiment of the disclosure is shown. The sub-block management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, the buffering component 150 may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device (s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
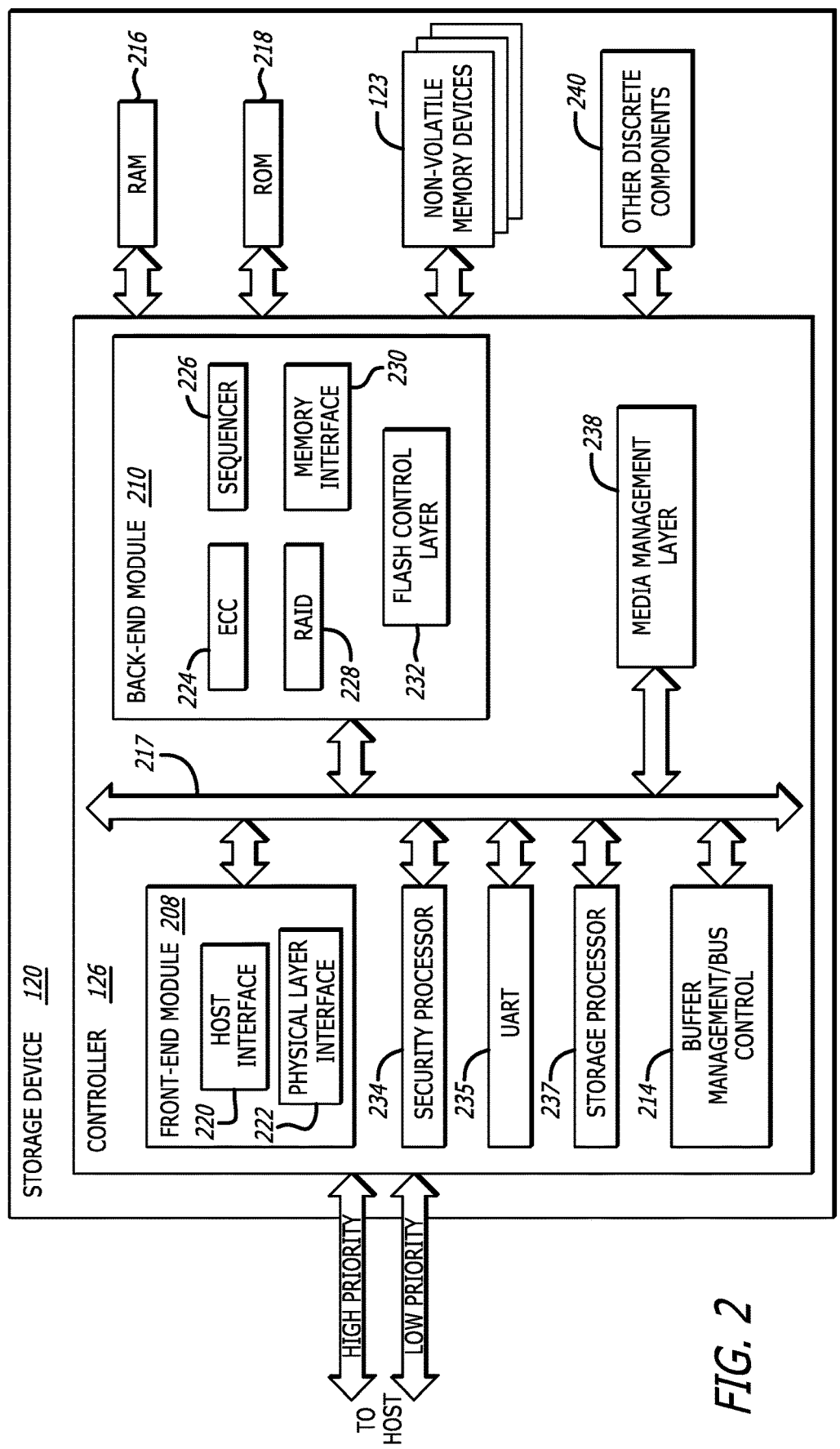
FIG. 2 is a schematic block diagram of a storage device suitable for decoupled booting in accordance with an embodiment of the disclosure.

Referring to FIG. 2, a schematic block diagram of a storage device 120 suitable for sub-block management in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

In additional embodiments, the storage device 120 may include a security processor 234. The security processor 234 can be a specialized processor that can utilize one or more security processes to verify and/or validate data and connections made by the storage device 120. The security processor can be configured to direct connection and communication with external devices. The bootloading process can direct data from an external device to a local storage within the controller/storage device, such as a static RAM (SRAM) array.

In various embodiments, the storage device 120 can be configured with a Universal Asynchronous Receiver Transmitter (UART) 235. The UART can provide for wireless communications between the storage device 120 and other external devices. These external devices like a host computing device, can store and provide bootloading data for booting the storage device 120.

In additional embodiments, a storage processor 237 can be configured within the storage device 120. The storage processor 237 can be utilized to execute code, logic, or other instructions stored within the storage device 120 and/or controller 126. The storage processor can load firmware from the memory array of the storage device 120 as well as execute it upon successful loading.

Figure 3:
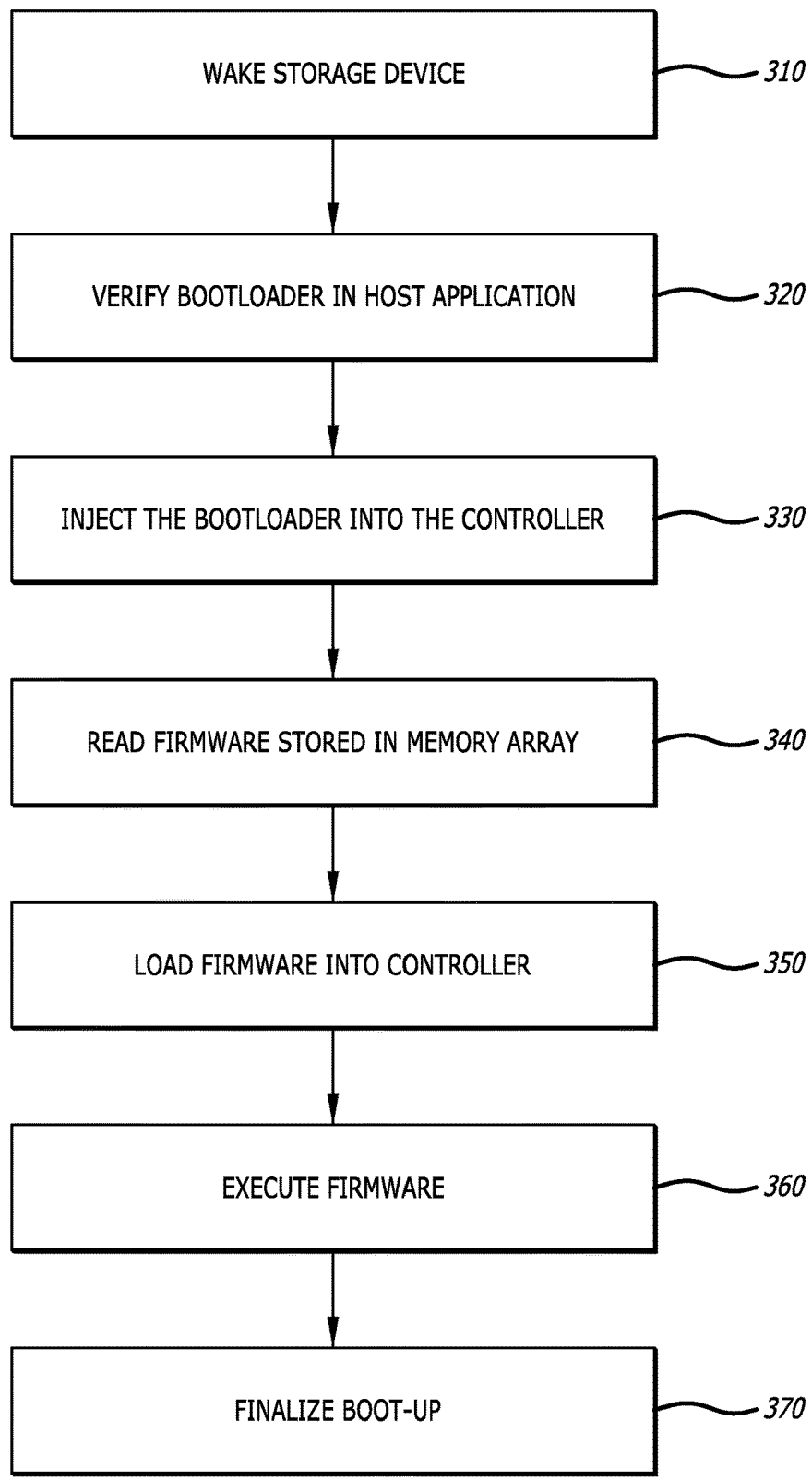
FIG. 3 is a flowchart depicting a process for decoupled booting in accordance with an embodiment of the disclosure.

Referring to FIG. 3, a flowchart depicting a process 300 for decoupled booting in accordance with an embodiment of the disclosure is shown. In many embodiments, the process 300 can start by waking a storage device (block 310). For example, storage devices may be configured to receive signals from various host computing devices such as, but not limited to, mobile computing devices, laptops, desktops, etc. The host computing device may include a host application that can communicate with the storage device.

In further embodiments, the process 300 can verify the bootloader in the host application (block 320). The bootloader can be an app or other digital delivery system that can transmit bootloading data from the host computing device to the storage device. Once verified, the bootloader can be injected into the controller of the storage device (block 330). Upon loading of the bootloading data into the storage device, execution of the bootloader can commence.

In a number of embodiments, the process 300 can read firmware that is stored within the memory array of the storage device (block 340). Once read, the firmware can be loaded into the controller (block 350). If the firmware is successfully loaded into the controller, or other storage device memory array, the firmware can subsequently be executed (block 360). The firmware can be executed to load all remaining data necessary to commence normal operations. The process 300 can then finalize boot-up of the storage device (block 370).

Figure 4:
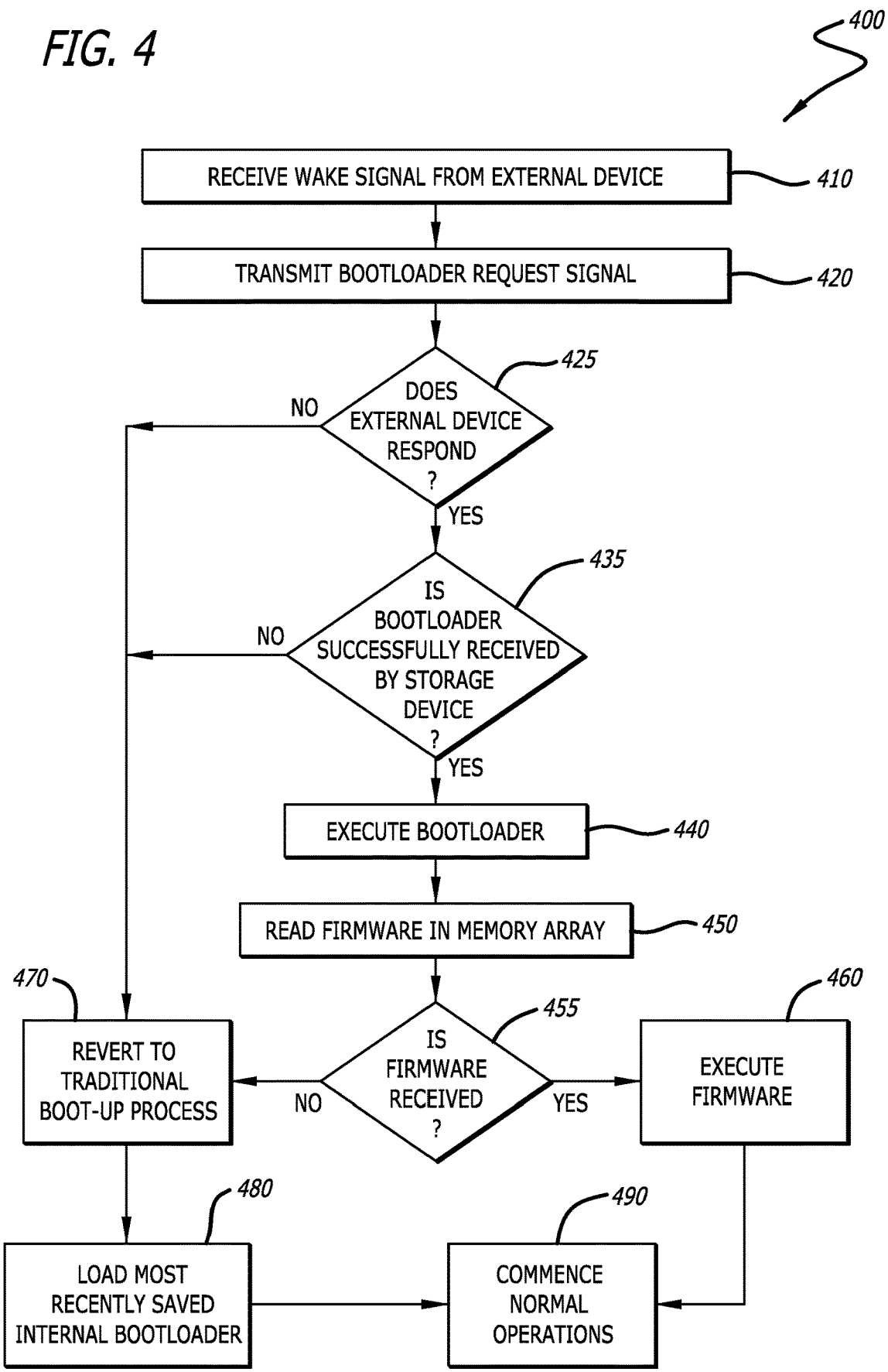
FIG. 4 is a flowchart depicting a process for determining boot methods in accordance with an embodiment of the disclosure.

Referring to FIG. 4, a flowchart depicting a process 400 for determining boot methods in accordance with an embodiment of the disclosure is shown. While decoupled booting can be preferred, there may be instances where a step in the decoupled booting process fails, and more traditional methods of booting may be required. In many embodiments, the process 400 can receive a wake signal from an external device (block 410). Various embodiments may require validation and/or verification from the external device.

In certain embodiments, the storage device can transmit a bootloader request signal (block 420). The process 400 can determine if the external device responds to the bootloader signal request (block 425). If no response is received, the process 400 can revert to traditional boot-up processes (block 470). These traditional processes can utilize previously stored bootloading or other required data. If the external device responds, the process 400 can determine if the bootloader/bootloading data was successfully received by the storage device (block 435). Again, if the data was not successfully received (either by data loss or verification fail), then the process 400 can revert to traditional boot-up processes (block 470). In some embodiments, the transmission and response determination is not done serially, but can be done in parallel though various handshake protocols. It is contemplated that a delay via a traditional back-and-forth handshake method can be avoided in various embodiments to decrease delay times in establishing a connection.

However, when the bootloader is successfully received, it can be executed (block 440). In additional embodiments, the bootloader can direct the storage device to read firmware data into an internal memory array (block 450). Upon reading, the process 400 can determine if the firmware was successfully received (block 455). If the firmware is not successfully or correctly read into the memory array, the process 400 can revert to traditional boot-up processes (block 470).

When the traditional boot-up processes are utilized, the process 400 can subsequently load the most recently saved internal bootloader and/or firmware (block 480). In certain embodiments, even when the external bootloader is successfully loaded and executed, the recently saved bootloader may be utilized when the firmware is unsuccessfully received. Once the most recent internal bootloader is loaded, the storage device can commence normal operations (block 490). However, when the firmware is successfully received, the firmware can be executed (block 460). Once executed, the storage device can commence normal operations (block 490).

Figure 5:
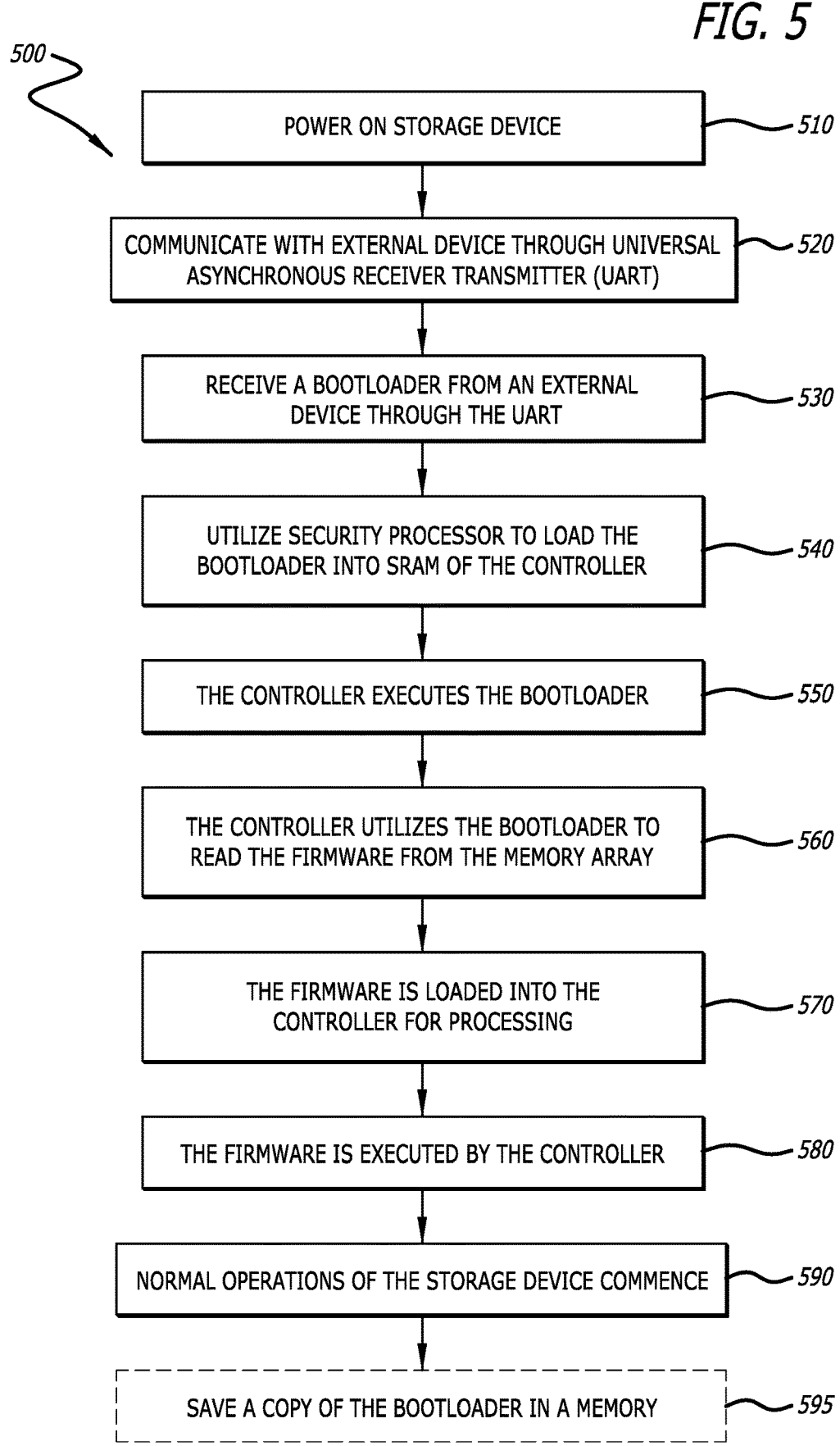
FIG. 5 is a flowchart depicting a process for storage device decoupled booting in accordance with an embodiment of the disclosure.

Referring to FIG. 5, a flowchart depicting a process 500 for storage device decoupled booting in accordance with an embodiment of the disclosure is shown. In a number embodiments, the process 500 can begin by powering on the storage device (block 510). The powering on may be from a received wake signal, or by a user pressing a button. The storage device can communicate with the external device through a wireless communication device such as, but not limited to, a universal asynchronous receiver transmitter (UART) (block 520). These types of wireless communicators can be configured to communicate over various protocols such as, but not limited to, Bluetooth®, Wi-Fi, and the like. Upon establishing the wireless communication link, the process 500 can receive a bootloader, often as bootloading data, from an external device through the UART (block 530).

In various embodiments, the storage device comprises a security processor to direct or load the bootloader into a memory device of the controller, such as a static random access memory (SRAM) (block 540). Once received, the controller can execute the bootloader (block 550). Once executed, the controller can utilize the bootloader to read firmware data from the main storage device memory array (block 560). The firmware can be read and subsequently loaded into the controller for processing (block 570). The controller may typically utilize the SRAM to store the firmware, and a separate storage device processor for processing and executing the firmware. The controller, once stored and verified in many embodiments, can execute the firmware (block 580). Upon successful loading of the firmware, the process 500 can commence normal operations of the storage device (block 590). In a number of embodiments, this can include establishing and conducting communications over a wired communication port, such as, but not limited to, a universal serial bus (USB) interface.

Optionally, the process 500 can save a copy of the bootloader into a memory (block 595). In additional embodiments, firmware or other data may be stored in a memory array within the controller, such as the SRAM, or a specialized memory array. Thus, when one or more steps in the decoupled boot process fail or produce uncorrectable errors, the storage device may revert to the traditional, internal-only methods of booting. Each time a successful decoupled boot occurs, various embodiments, may check the date and/or version of the bootloading or firmware data and overwrite the previously stored local version if it is determined that a newer version was received from the external device.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
   a memory array comprising a plurality of memory devices;
   a Universal Asynchronous Receive Transmitter (UART) communication port coupled with a second device; and
   a controller, comprising:
      a controller memory array;
      a security processor configured to:
         establish communication with the second device; and
         load bootloading data into the controller memory array;
      a storage processor configured to:
         determine if the device responds to a transmitted bootloader signal request;
         revert to one or more traditional boot-up processes if no response is received, wherein the traditional boot-up processes are configured to utilize previously stored bootloading data;
         execute the bootloading data in the controller memory array;

load firmware data in the memory array;
execute the firmware data; and
begin communication with the second device via the communication port.

2. The device of claim 1, wherein the communication port is a wireless communication port.

3. The device of claim 2, wherein the security processor establishes communication with the second device via the wireless communication port.

4. The device of claim 3, wherein the UART communicates with the second device via Bluetooth.

5. The device of claim 4, wherein the second device is a mobile computing device.

6. The device of claim 1, wherein the security processor further comprises a security memory.

7. The device of claim 6, wherein the security memory includes logic for establishing wireless communication with the second device.

8. The device of claim 1, wherein the security processor is further configured to enable the storage processor.

9. The device of claim 8, wherein the storage processor is enabled upon completion of a security check.

10. The device of claim 1, wherein the communication port is a universal serial bus (USB) port.

11. A method of booting up a storage device, comprising:
establishing communication with a second device via a Universal Asynchronous Receive Transmitter (UART);
determining if the storage device responds to a transmitted bootloader signal request;
reverting to one or more traditional boot-up processes if no response is received, wherein the traditional boot-up processes are configured to utilize previously stored bootloading data;
loading bootloading data from the second device into a first memory array within the storage device;
executing the loaded bootloading data;
loading firmware data within a second memory array into the first memory array;
executing the loaded firmware data; and
establishing communication with the second device via a wired communication port.

12. The method of claim 11, wherein the communication is via a Bluetooth connection.

13. The method of claim 12, wherein the second device is a mobile computing device.

14. The method of claim 11, wherein the method further comprises saving a copy of the bootloading data within the storage device upon establishing communication with the second device via the wired communication port.

15. The method of claim 14, wherein the bootloading data is validated upon being loaded.

16. The method of claim 15, wherein, in response to a failure to validate the bootloading data, a previously saved copy of the bootloading data is loaded.

17. The method of claim 11, wherein the method further comprises saving a copy of the firmware data within the storage device upon loading the firmware data from the second memory array into the first memory array.

18. The method of claim 17, wherein, upon a failure to load the firmware data into the second memory array, a previously saved copy of the firmware is loaded executed.

19. A device comprising:
a memory array;
a wired Universal Asynchronous Receive Transmitter (UART) communication port coupled with a second device; and
a controller, comprising:
a controller memory array;
a security processor configured to:
establish a wireless communication connection with the second device;
verify accessibility of bootloading data;
load, via the wireless communication connection, bootloading data into the controller memory array; and
validate the bootloading data; and
a storage processor configured to:
determine if the device responds to a transmitted bootloader signal request;
revert to one or more traditional boot-up processes if no response is received, wherein the traditional boot-up processes are configured to utilize previously stored bootloading data;
execute the bootloading data in the controller memory array;
load firmware data in the controller memory array;
execute the firmware data; and
begin communication with the second device via the wired communication port.

* * * * *